United States Patent
Rao et al.

(10) Patent No.: US 10,997,432 B2
(45) Date of Patent: *May 4, 2021

(54) METHOD AND SYSTEM TO DETERMINE VEHICLE SPEED

(71) Applicant: Transportation IP Holdings, LLC, Norwalk, CT (US)

(72) Inventors: Dattaraj Jagdish Rao, Bangalore (IN); Scott Daniel Nelson, Melbourne, FL (US); Nidhi Naithani, Bangalore (IN); Nikhil Uday Naphade, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 214 days.

This patent is subject to a terminal disclaimer.

(21) Appl. No.: 16/158,867

(22) Filed: Oct. 12, 2018

(65) Prior Publication Data
US 2019/0042861 A1  Feb. 7, 2019

Related U.S. Application Data

(63) Continuation of application No. 14/979,011, filed on Dec. 22, 2015, now Pat. No. 10,176,386.
(Continued)

(51) Int. Cl.
*G06K 9/00* (2006.01)
*G06T 7/20* (2017.01)
(Continued)

(52) U.S. Cl.
CPC ....... *G06K 9/00798* (2013.01); *B60W 40/105* (2013.01); *G01P 3/38* (2013.01);
(Continued)

(58) Field of Classification Search
CPC ... G06K 9/00; G06T 7/20; B60Q 1/02; B60Q 1/00; G09G 5/00; G01P 3/38
See application file for complete search history.

(56) References Cited

U.S. PATENT DOCUMENTS 7,764,808 B2 * 7/2010 Zhu ................... G06K 9/3241
                                                         382/104
8,140,214 B2 * 3/2012 Krokel .................. G06T 7/246
                                                          701/32.5
(Continued)

FOREIGN PATENT DOCUMENTS

CN         1667666 A         9/2005
CN         1910626 A         2/2007
(Continued)

OTHER PUBLICATIONS

Machine Translation and First Office Action and Search issued in connection with corresponding CN Application No. 201511036322.2 dated May 4, 2018.

*Primary Examiner* — Yuri Kan
(74) *Attorney, Agent, or Firm* — Christopher R. Carroll; The Small Patent Law Group LLC (57) ABSTRACT

A locomotive speed determination system and method receive image data of a field of view of a camera operably disposed onboard a locomotive. A speed and/or heading of the locomotive are determined as the vehicle is moving based at least in part on one or more differences in the image data. In one aspect, pixel intensities in different images or frames may be examined to identify one or more features of interest in the images or frames. Movement of the one or more features of interest in the images or frames is correlated to movement of the locomotive along the route, and the time difference between when the images or frames are obtained can be used to determine the locomotive speed.

19 Claims, 6 Drawing Sheets

Related U.S. Application Data (60) Provisional application No. 62/097,377, filed on Dec. 29, 2014.

(51) Int. Cl.
 *G01P 3/38* (2006.01)
 *G01S 11/12* (2006.01)
 *B60W 40/105* (2012.01)
 *G06T 7/246* (2017.01)
 *G08G 1/16* (2006.01)

(52) U.S. Cl.
 CPC .............. *G01S 11/12* (2013.01); *G06T 7/246* (2017.01); *B60W 2420/42* (2013.01); *G06T 2207/30256* (2013.01); *G08G 1/167* (2013.01); *Y02T 10/72* (2013.01)

(56) References Cited

U.S. PATENT DOCUMENTS

| | | | |
|---|---|---|---|
| 10,176,386 B2* | 1/2019 | Rao | G06K 9/00798 |
| 2003/0169213 A1* | 9/2003 | Spero | G02B 27/0093 |
| | | | 345/7 |
| 2004/0008110 A1* | 1/2004 | Stam | B60Q 1/085 |
| | | | 340/469 |
| 2008/0091315 A1 | 4/2008 | Krokel et al. | |
| 2010/0321174 A1* | 12/2010 | Chen | B60Q 9/008 |
| | | | 340/435 |
| 2011/0051992 A1* | 3/2011 | Cobb | G06K 9/00986 |
| | | | 382/100 |

FOREIGN PATENT DOCUMENTS

| | | |
|---|---|---|
| CN | 103733077 A | 4/2014 |
| JP | 5030983 B2 | 9/2012 |

* cited by examiner

METHOD AND SYSTEM TO DETERMINE VEHICLE SPEED

CROSS-REFERENCE TO RELATED APPLICATIONS

This application is a continuation of U.S. patent application Ser. No. 14/979,011, filed on 22 Dec. 2015, which claims priority to U.S. Provisional Application No. 62/097,377, filed on 29 Dec. 2014, the entire disclosures of which are incorporated herein by reference.

FIELD

Embodiments of the subject matter disclosed herein relate to determining vehicle speed.

BACKGROUND

A vehicle may include a sensor for measuring vehicle speed. For example, automobile speed may be determined based on a rotating magnetic field that is generated by a magnet coupled to an axle or other part of the vehicle that moves proportionally to the vehicle speed. The vehicle speed may be communicated to an operator of the vehicle for assessing compliance with traffic control regulations (e.g., speed limits), or to a vehicle control system for automatically or otherwise controlling the vehicle based on the measured speed. If the sensor is damaged, however, such functionality may not be available.

In some transportation systems, government regulations require a vehicle, or certain designated classes or types of vehicles, to have redundant means for determining vehicle speed. For example, under some positive train control (PTC)-related regulations, locomotives or other powered rail vehicles may be required to have redundant speed sensors. Such redundant sensors, however, may add significantly to the cost of the locomotive or other rail vehicle.

BRIEF DESCRIPTION

In an embodiment, a system includes one or more analysis processors configured to be operably disposed onboard a vehicle and configured to receive image data of a field of view of a camera operably disposed onboard the vehicle. At least part of the field of view includes a route of the vehicle external to the vehicle. The one or more analysis processors are further configured to determine a speed of the vehicle when the vehicle is moving based at least in part on the image data.

In another embodiment, a method includes receiving image data of a field of view a camera operably disposed onboard a vehicle. At least part of the field of view includes a route of the vehicle external to the vehicle. The method further includes determining a speed of the vehicle when the vehicle is moving based at least in part on the image data.

In one embodiment, a system (e.g., a vehicle speed determination system) includes one or more analysis processors configured to be operably disposed onboard a vehicle and configured to receive image data of a field of view of a camera operably disposed onboard the vehicle. The one or more analysis processors are further configured to determine one or more of a speed or a heading of the vehicle as the vehicle is moving based at least in part on one or more differences in the image data.

In one embodiment, a method (e.g., for determining a speed of a vehicle) includes receiving image data of a field of view a camera operably disposed onboard a vehicle and determining a speed of the vehicle when the vehicle is moving based at least in part on one or more differences in the image data.

In one embodiment, a system (e.g., a vehicle speed determination system) includes one or more processors configured to receive images obtained at different times from a camera onboard a vehicle moving along a route. The one or more processors also are configured to determine a difference between the images and to determine one or more of a heading or a speed of the vehicle along the route based on the difference between the images.

BRIEF DESCRIPTION OF THE DRAWINGS

Reference is made to the accompanying drawings in which particular embodiments and further benefits of the inventive subject matter are illustrated as described in more detail in the description below, in which.

DETAILED DESCRIPTION

Embodiments of the inventive subject matter relate to vehicle speed determination systems and methods. The systems can be disposed onboard a vehicle that travels along a route. During movement along the route, a camera onboard the vehicle can generate image data of the route (e.g., image data of a route surface on which the vehicle travels, or areas around the route external to the vehicle). The image data is examined onboard the vehicle in order to determine a speed of the vehicle. If the camera is an existing camera that is onboard the vehicle for other purposes (e.g., as a safety-related video data recorder), the systems and methods may provide a redundant mechanism for determining vehicle speed, in instances where such a function is required, at less cost than a redundant sensor-based system, and with more accuracy than (for example) a GPS-based system. The image data may include static images (e.g., still images) and/or videos (e.g., moving images).

Figure 1:
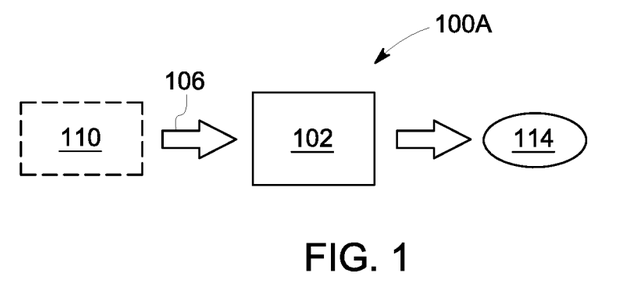
FIG. 1 is a schematic illustration of a vehicle speed determination system according to an embodiment of the inventive subject matter.
Figure 2:
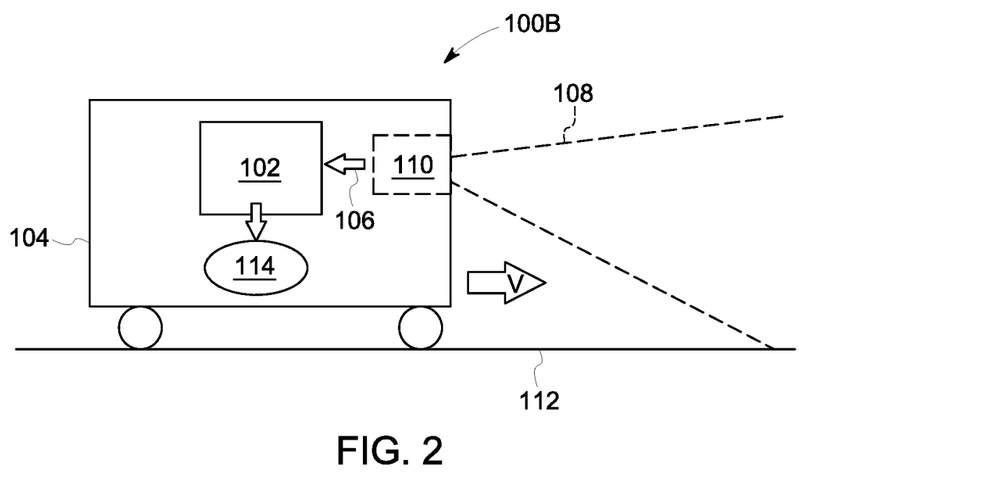
FIG. 2 is a schematic illustration of a vehicle speed determination system according to another embodiment of the inventive subject matter.

With reference to FIGS. 1 and 2, in one or more embodiments, systems 100A, 100B (e.g., vehicle speed determination systems) comprise one or more analysis processors 102 configured to be operably disposed onboard a vehicle 104 and configured to receive image data 106 of a field of view 108 of a camera 110 operably disposed onboard the vehicle. The camera 110 may be operably disposed onboard the vehicle by being directly or indirectly connected with the vehicle or another object that moves along with the vehicle. The camera 110 may be disposed inside the vehicle, such as an interior camera, or on the exterior of the vehicle. At least part of the field of view of the camera includes a route 112 of the vehicle external to the vehicle (i.e., the image data is of the field of view, which is at least partially external to the vehicle). The one or more analysis processors 102 are further configured to determine a speed 114 of the vehicle (e.g., a non-zero speed of when the vehicle is moving; "v" in FIG. 2 indicates movement) based at least in part on the image data 106. The speed that is determined is an approximate measurement of the actual speed of the vehicle. In one or more embodiments, the system 100A, 100B is configured to automatically determine the speed 114, without operator intervention. The processors 102 can include or represent one or more hardware circuits or circuitry that includes and/or is coupled with one or more computer processors (e.g., microprocessors, controllers, field programmable gate arrays, integrated circuits, or other electronic logic-based devices).

In the embodiment of the system 100B shown in FIG. 2, the camera 110 is operably disposed onboard the vehicle 104 and is oriented such that the field of view 108 of the camera includes the route 112, namely, the field of view includes a road surface or a guided track that the vehicle 104 travels on. Guided track refers to a single rail (such as for a monorail), a set of parallel rails (such as for a train that includes locomotives and non-propulsion rail cars for carrying passengers and/or cargo), wayside guides that keep a vehicle within a designated area, cables along which a vehicle travels, etc.

Figure 3:
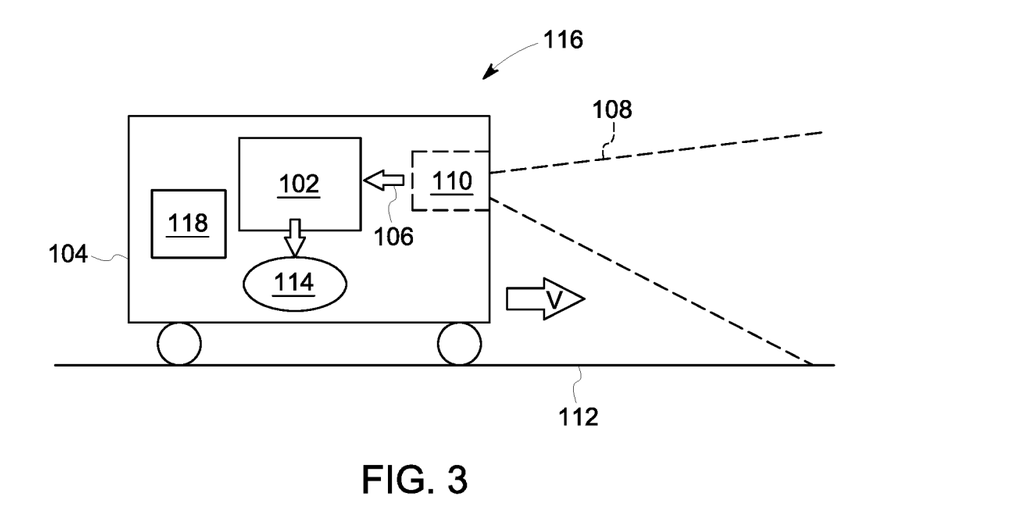
FIG. 3 is a schematic illustration of a vehicle speed determination system according to another embodiment of the inventive subject matter.

In another embodiment, with reference to FIG. 3, a system 116 (e.g., vehicle speed determination system) is generally similar to the systems shown in FIGS. 1 and 2, and further comprises a vehicle control system 118 configured to be operably disposed onboard the vehicle 104. The vehicle control system 118 includes or represents hardware circuitry that includes and/or is coupled with one or more computer processors (e.g., microprocessors, controllers, field programmable gate arrays, integrated circuits, or other electronic logic-based devices). The vehicle control system 118 may generate electronic signals communicated to propulsion systems (e.g., motors, alternators, generators, etc.) and/or brake systems to control movement of the vehicle, signals communicated to an output device (e.g., a display, speaker, etc.) to report the vehicle speed, signals communicated to an off-board location (e.g., via transceiving circuitry of the control system) for monitoring the vehicle speed, etc. The vehicle control system 118 is configured to automatically control the vehicle based on the speed 114 that is determined, control display of the speed that is determined to an operator, control storage onboard the vehicle of information of the speed that is determined, and/or control communication off board the vehicle of the information of the speed that is determined. For example, the vehicle control system 118 may be configured to automatically control the vehicle based on the speed 114 that is determined. If the vehicle control system 118 determines that the vehicle speed is faster than a designated speed, then the vehicle control system 118 may automatically operate to slow or stop movement of the vehicle.

As another example, if the vehicle control system 118 determines that the vehicle speed is slower than a designated speed, then the vehicle control system 118 may automatically operate to speed up movement of the vehicle. Optionally, if the vehicle control system 118 determines that the vehicle speed is faster than a designated speed, then the vehicle control system 118 may automatically generate a signal to notify an operator of the vehicle to slow or stop movement of the vehicle. As another example, if the vehicle control system 118 determines that the vehicle speed is slower than a designated speed, then the vehicle control system 118 may automatically generate a signal to notify the operator to speed up movement of the vehicle. The designated speed may be a speed limit of the route, a speed designated by a trip plan that designates speeds of the vehicle as a function of time, distance along a route, and/or locations along the route, or another speed.

Figure 4:
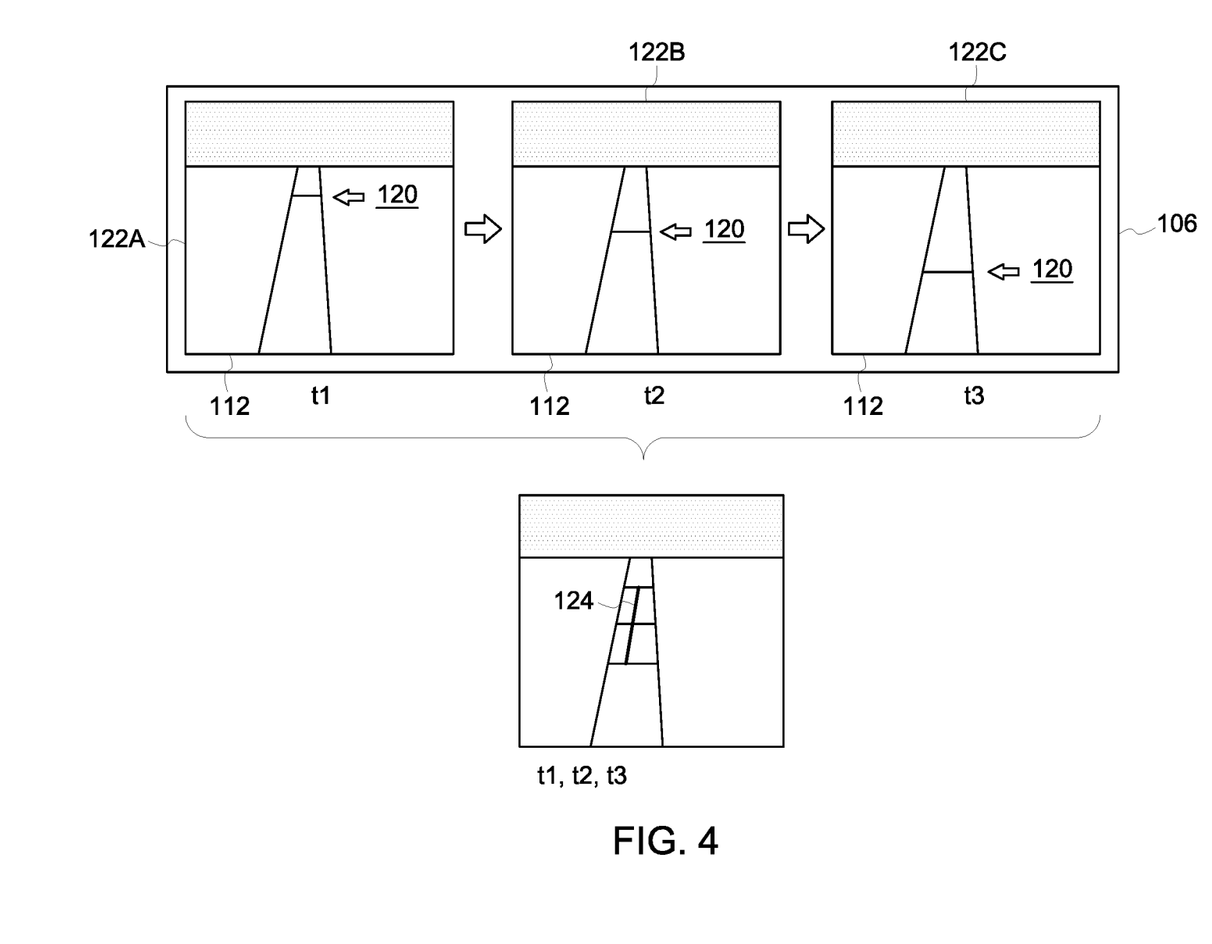
FIG. 4 is a schematic illustration of image data analysis, according to an embodiment of the inventive subject matter.

In another embodiment, with reference to FIG. 4, the one or more analysis processors 102 are configured to determine (e.g., automatically) the speed 114 by the following process: (i) identify at least one image feature 120 of the route in the image data 106 that moves in time across plural frames 122a, 122b, 122c, etc. of the image data (t1, t2, and t3 represent different, successive points in time); (ii) determine a total pixel distance 124 by which the at least one image feature has moved (in the bottom portion of FIG. 4, the three frames 122a, 122b, 122c are shown in a composite or overlaid view, to graphically represent the total pixel distance 124 for the sake of illustration); (iii) determine a pixel rate of change based on the total pixel distance 124 and a frame rate at which the image data is captured; and (iv) determine the speed 114 based on the pixel rate of change and a correlation of a unit pixel distance to a unit route distance. For example, pixel rate of change may be multiplied by the ratio of unit route distance to unit pixel distance, resulting in a ratio of route distance to time, which is equivalent to vehicle speed.

The image feature can be a feature of interest, such as a rail tie, insulated joint, sign, tree, road stripe, crossing, etc., that is stationary with respect to the route being traveled upon. The images or frames obtained at different times can be examined in order to determine a total pixel distance by which the feature of interest has moved. The total pixel distance represents the distance (e.g., in terms of pixel size, the number of pixels, etc.) that the image feature has changed in the image data. The pixel rate of change can represent the speed at which the location of the image feature has changed in the images. For example, if two images are acquired at times that are one second apart (e.g., the frame rate is one frame per second) and an image feature has moved fifty pixels between the images, then the pixel rate of change may be fifty pixels per second. The vehicle speed can be determined based on the pixel rate of change and a correlation factor of a unit pixel distance to a unit route distance. For example, the pixel rate of change may be multiplied by the ratio of unit route distance to unit pixel distance, resulting in a ratio of route distance to time, which is equivalent to vehicle speed.

To identify the at least one image feature 120 of the route in the image data 106 that moves in time across plural frames 122a, 122b, 122c, etc. of the image data, the one or more analysis processors may be configured to convert the image data to or generate the image data as wireframe model data, as described in U.S. Publication No. 2015-0294153A1, dated Oct. 15, 2015, which is titled "Route Damage Prediction System And Method" (the "'294 application"), the entire disclosure of which is incorporated by reference in its entirety. The wireframe model data can be used to identify image features common to plural frames.

The frames 122a, 122b, 122c, etc. may each be a respective digital image formed from plural pixels of varying color and/or intensity. Pixels with greater intensities may be lighter in color (e.g., more white) while pixels with lesser intensities may be darker in color. In one aspect, the one or more image analysis processors are configured to examine the intensities of the pixels to determine which one or more features are common to plural frames. For example, the processor(s) may select those pixels having a particular combination of features (e.g., a line of more intense pixels bordering a line of less intense pixels, arranged generally horizontally in the field of view, such as might represent a rail tie, for example), and look for a match in subsequent frames. In one embodiment, the analysis processor(s) only use the intensities of pixels to identify features of interest in the images or frames, which are then used to determine the vehicle speed, as described herein. Alternatively, the analysis processor(s) may use other characteristics of the images to detect the features of interest, such as chromacity or other characteristics.

To explain further, the camera 110 can obtain several images/frames 122a, 122b, 122c over time of an upcoming segment of the route 112 during movement of the vehicle 104 along the route 112. The analysis processor(s) 102 may control the camera 110 to acquire the images/framers at relatively fast frame rates, such as at least by obtaining 300 images per second per camera, 120 images per second per camera, 72 images per second per camera, 48 images per second per camera, 30 images per second per camera, 24 images per second per camera, or another rate.

The analysis processor(s) then compares the images obtained by the camera to identify differences in the images. These differences can represent image features, which are objects on or near the segment of the route that the vehicle is traveling toward. FIG. 4 includes an overlay representation of three images/frames acquired by the camera and overlaid on each other according to one example of the inventive subject matter described herein. The overlay representation represents three images of the same segment of the route taken at different times by the camera and combined with each other. The analysis processor(s) may or may not generate such an overlay representation when examining the images for an object.

As shown in the representation, the route is a persistent object in that the route remains in the same or substantially same location in the images/frames obtained at different times. This is because the route is not moving laterally relative to the direction of travel of the vehicle (shown in FIG. 2) as the vehicle travels along the route. The analysis processor(s) can identify the route by examining intensities of pixels in the images, as described above, or using another technique.

Also as shown in the overlay representation, an image feature appears in the frames. The analysis processor(s) can identify the image feature by examining intensities of the pixels in the images/frames (or using another technique) and determining that one or more groups of pixels having the same or similar (e.g., within a designated range) of intensities appear in locations of the images that are close to each other.

Figure 5:
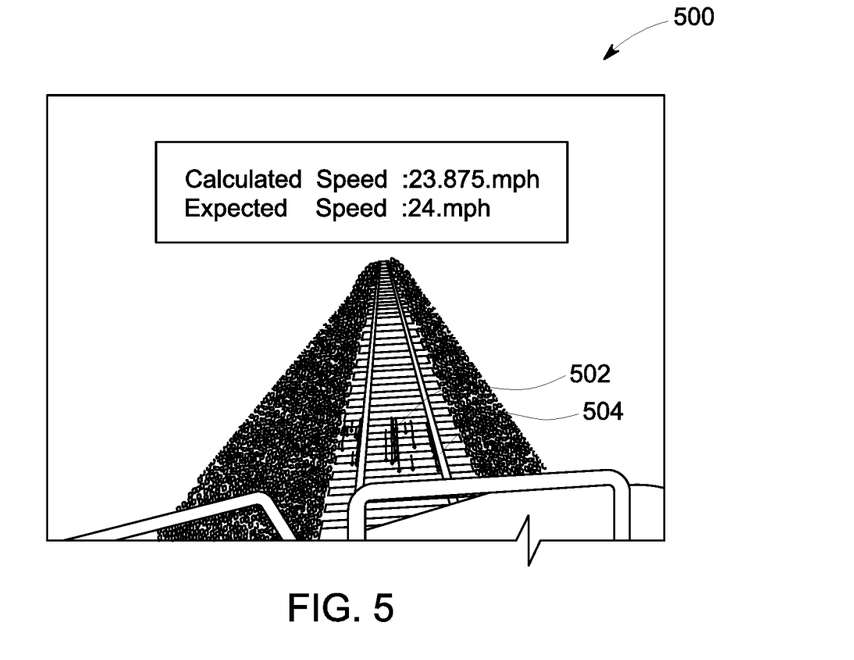
FIG. 5 illustrates a single frame or image acquired by the camera shown in FIGS. 1 through 3 according to one example.
Figure 6:
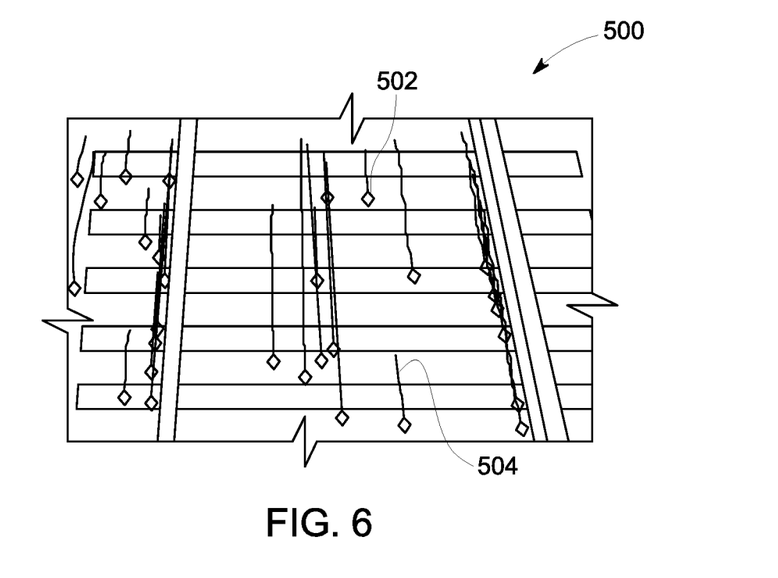
FIG. 6 illustrates a portion of the frame or image shown in FIG. 5.

FIG. 5 illustrates a single frame or image 500 acquired by the camera 110 shown in FIGS. 1 through 3 according to one example. FIG. 6 illustrates a portion of the frame or image 500 shown in FIG. 5. The image 500 shown in FIGS. 5 and 6 includes several features of interest 502. The features of interest 502 may be objects appearing in two or more images acquired at different times. For example, the features of interest 502 may be edges of railroad ties, trees, signs, insulated joints in a rail, telephone poles, power lines, stripes on pavement (e.g., between neighboring lanes of a road), etc. The features of interest 502 may be stationary with respect to the route so that changes in the location of the features of interest 502 in images or frames acquired at different times can be used to determine the speed of the vehicle.

The analysis processors may identify one or more features of interest 502 in two or more of the images acquired at different times and examine the images 500 to determine differences in where the features of interest 502 are located in the images 500. Based on the differences, the analysis processors can determine how fast the vehicle is moving and/or a direction of movement (or heading) of the vehicle.

In one embodiment, the analysis processor(s) may identify the features of interest using one or more convolution filters. A convolution filter may be applied to an image or video frame in order to sharpen the image or frame, detect edges in the image or frame, etc. As one example, pixel intensities or other values of the pixels in the image or frame are converted or examined as a two dimensional matrix. This results in the image being examined as a matrix of numbers representative of pixel intensities or other pixel values (referred to as an image matrix). A smaller matrix (e.g., a matrix having a smaller number of rows and/or columns than the matrix representative of the image or frame) is assigned values and is applied to the image matrix. The smaller matrix may be applied to the image matrix by overlaying the smaller matrix onto the image matrix and multiplying the values of the smaller matrix and the image matrix. For example, if the top left value in the image matrix has a value of 20 and the top left value in the smaller matrix has a value of −1, then applying the smaller matrix to the image matrix results in the top left value in combination of the matrices having a value of −20. The values of the combination of the matrices are combined, which can be achieved by summing the values. For example, if the combination of the matrices results in a matrix having values of −20, 15, −25, 120, 88, 111, −77, −25, then the combination of the matrices can be 187. Optionally, this sum can be divided by a divisor value and/or a bias value may be added. The combination of the matrices (with or without the divisor and/or bias) provides a new pixel value. The image matrix is examined again to determine if one or more values in the image matrix are greater than or less than the value of the combined matrices. For example, if the smaller matrix is a 3 by 3 matrix, then the value of the center portion of the image matrix that the smaller matrix was combined with is compared to the value of the combined matrices. If this pixel value is greater than or equal to the value of the combined matrices, then the value of the pixel in the image is changed to the value of the combined matrices. But, if the pixel value is less than the value of the combined matrices, then the value of the pixel in the image is changed to zero or another designated value. For example, if the value of the center pixel in the 3 by 3 portion of the image matrix that was combined with the smaller matrix is 190, then the value of this pixel in the image is changed to 187. But, if the value of this center pixel is 65, then the value of this pixel in the image is changed to 0. The smaller matrix may be combined with other portions of the image matrix to combine the smaller matrix with the different portions of the image matrix and modify pixel values of the image as described above. The values of the image can be changed to cause edges or other objects to be more apparent or easily identified by the analysis processor(s). The analysis processor(s) may then detect the edges or other portions as features of interest.

Trace lines 504 illustrate how far the different features of interest 502 have moved between the images 500. Longer trace lines 504 indicate that the location of the corresponding feature of interest 502 has changed more between the images 500 than shorter trace lines 504. A trace line 504 represents the difference in a feature of interest 502 that can be used by the analysis processors to determine the speed and/or heading of the vehicle. The analysis processor may be calibrated or programmed with a correlation factor or ratio between distance in the images 500 and a distance along the route. A correlation factor or ratio can be a numerical value indicating how far a distance in an image represents along the route. For example, one hundred pixels in the images 500 can represent twenty centimeters along the route. The correlation factor or ratio can be used by the analysis processors to determine how fast the vehicle is moving.

For example, if a location of a feature of interest 502 moves 294 pixels between images 500 and one hundred pixels in an image 500 represents ten centimeters along the route, then the change in location of the feature of interest 502 between the images 500 can indicate that the vehicle has moved 29.4 centimeters between the times that the images 500 were obtained. If the images 500 were obtained sequentially at a rate of thirty frames per second, then the analysis processor may determine that the vehicle has moved 29.4 centimeters in one thirtieth of a second, or 31.7 kilometers per hour.

In one aspect, the correlation factor is different for changes in image distance in different locations of the image. For example, if a feature of interest moves by 100 pixels in the top portion or zone of an image, this may represent movement of 0.5 meters along the route. But, if the same feature of interest moves by 100 pixels in the bottom portion of the image (where the pixels in the top and bottom portions are the same size), this may represent movement of 0.3 meters along the route. The correlation factor may be different for different regions or portions of the image or frame due to the angle at which the camera is oriented relative to the route. Therefore, identical changes in location of a feature of interest in different zones of an image may represent different changes in location along the route. The different correlation factors may be used to provide a more accurate determination of moving speed of the vehicle.

The analysis processor(s) can track multiple features of interest in multiple images or frames to determine the speed of the vehicle. In one aspect, the analysis processor(s) may use those features of interest that are detected by the analysis processor(s) in at least a designated, non-zero threshold number of the images or frames, such as ten images or frames (or another value). If a feature of interest appears in less images or frames than this threshold number, then that feature of interest may not be used to determine the speed of the vehicle. Those features of interest that appear in at least this threshold number of images or frames can be used to determine the speed of the vehicle.

In embodiments, the features of interest are not designated or otherwise known to the system (e.g., to the analysis processor(s)) ahead of time, before the image data is collected and analyzed. That is, the features of interest can be any qualifying features (e.g., the features are persistent across multiple successive image frames and/or have intensity characteristics or other characteristics suitable for assessing pixel distance, as described herein), and are not arranged or distributed along the route for purposes of determining vehicle speed using video analytics. This does not preclude the possibility that such pre-determined or pre-established route features (e.g., designated route markers, and/or specially encoded or marked route markers) could be features of interest from an incidental standpoint. Rather, it means that such pre-determined or pre-established route features are not required for operation of the system here.

Figure 7:
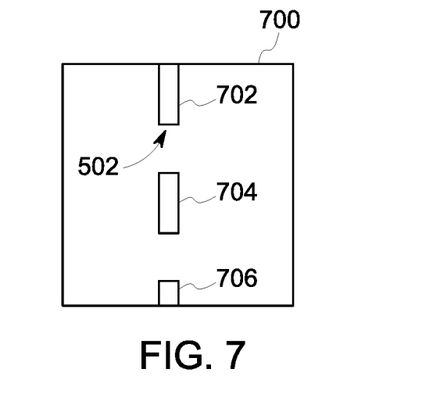
FIG. 7 illustrates an image or frame obtained by the camera shown in FIG. 1 at a first time according to one example.
Figure 8:
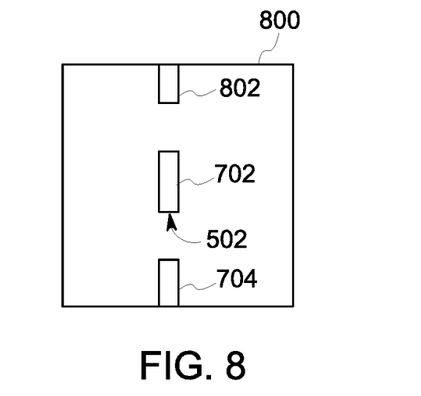
FIG. 8 illustrates another image or frame obtained by the camera shown in FIG. 1 at a subsequent, second time.

FIG. 7 illustrates an image or frame 700 obtained by the camera 110 at a first time according to one example. FIG. 8 illustrates another image or frame 800 obtained by the camera 110 at a subsequent, second time. The images or frames 700, 800 can be acquired of portions of a route, such as a road. The analysis processors can identify one or more features of interest 502, such as stripes 702, 704, 706 painted on the road in the illustrated example. Alternatively, the features of interest 502 may include rail ties, signs, etc. A feature of interest 502 can be an entire stripe or a portion of a stripe, such as an edge of a stripe. As shown in FIGS. 7 and 8, the locations of the stripes 702, 704, 706 change between the image 700 and the image 800, with the stripe 706 no longer visible in the subsequent image 800 and an additional stripe 802 visible in the image 800.

Figure 9:
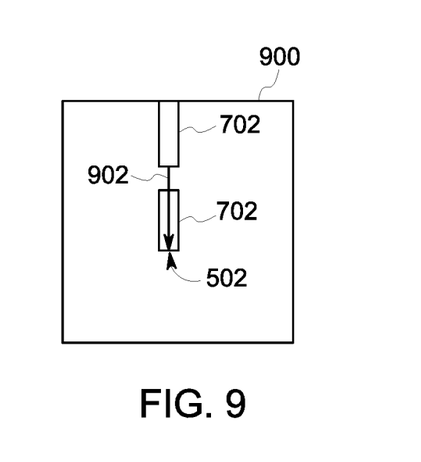
FIG. 9 illustrates an overlay image of part of image shown in FIG. 7 and part of the image shown in FIG. 8.

FIG. 9 illustrates an overlay image 900 of part of image 700 shown in FIG. 7 and part of the image 800 shown in FIG. 8. The overlay image 900 illustrates the change in position of the stripe 702 between the image 700 and the image 800. The other stripes 704, 706, 802 are not shown in the overlay image 900. The analysis processors can examine changes in locations of the feature of interest 502, such as a bottom edge of the stripe 702, between the images 700, 800 to identify a difference 902 in the feature of interest 502. In the overlay image 900, the difference 902 in the feature of interest 502 is shown as a vector having a direction that is opposite of a direction of travel of the vehicle and a magnitude that is proportional to the speed of the vehicle. As described above, the analysis processors can examine the magnitude of the difference 902 to determine how fast the vehicle is moving, such as by scaling the magnitude of the difference 902 by a correlation factor that relates pixel sizes or other distances in the images to distances along the route. The analysis processors optionally can examine the orientation or direction of the difference 902 to determine the direction of movement or heading of the vehicle. For example, the analysis processors may identify the direction of movement or heading of the vehicle as being opposite of the difference 902 shown in FIG. 9.

Figure 10:
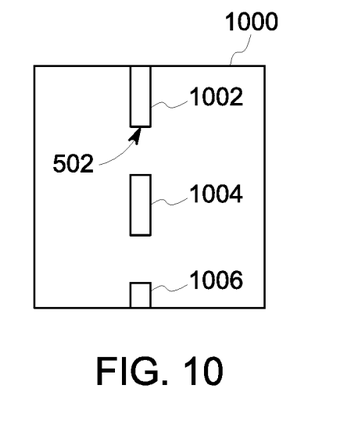
FIG. 10 illustrates an image or frame obtained by the camera shown in FIG. 1 at a first time according to one example.
Figure 11:
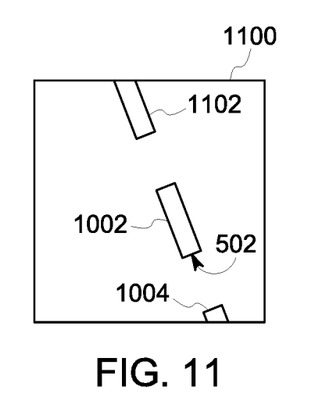
FIG. 11 illustrates another image or frame obtained by the camera shown in FIG. 1 at a subsequent, second time.

FIG. 10 illustrates an image or frame 1000 obtained by the camera 110 at a first time according to one example. FIG. 11 illustrates another image or frame 1100 obtained by the camera 110 at a subsequent, second time. The images or frames 1000, 1100 can be acquired of portions of a route, such as a road. The analysis processors can identify one or more features of interest 502, such as stripes 1002, 1004, 1006 painted on the road in the illustrated example. Alternatively, the features of interest 502 may include rail ties, signs, etc. A feature of interest 502 can be an entire stripe or a portion of a stripe, such as an edge of a stripe. As shown in FIGS. 10 and 11, the locations of the stripes 1002, 1004, 1006 change between the image 1000 and the image 1100, with the stripe 1106 no longer visible in the subsequent image 1100 and an additional stripe 1102 visible in the image 1100.

Figure 12:
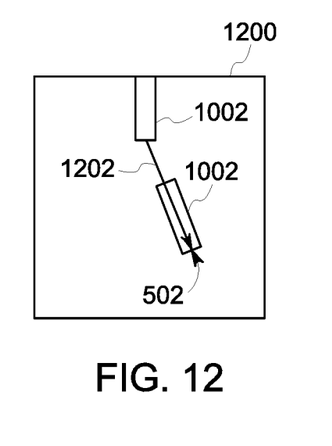
FIG. 12 illustrates an overlay image of part of image shown in FIG. 10 and part of the image shown in FIG. 11.

FIG. 12 illustrates an overlay image 1200 of part of image 1000 shown in FIG. 10 and part of the image 1100 shown in FIG. 11. The overlay image 1200 illustrates the change in position of the stripe 1002 between the image 1000 and the image 1100. The other stripes 1004, 1006, 1102 are not shown in the overlay image 1200. The analysis processors can examine changes in locations of the feature of interest 502, such as a bottom edge of the stripe 1002, between the images 1000, 1100 to identify a difference 1202 in the feature of interest 502. In the overlay image 1200, the difference 1202 in the feature of interest 502 is shown as a vector having a direction that is opposite of a direction of travel of the vehicle and a magnitude that is proportional to the speed of the vehicle. As described above, the analysis processors can examine the magnitude of the difference 1202 to determine how fast the vehicle is moving, such as by scaling the magnitude of the difference 1202 by a correlation factor that relates pixel sizes or other distances in the images to distances along the route.

The analysis processors optionally can examine the orientation or direction of the difference 1202 to determine the direction of movement or heading of the vehicle. For example, the change in positions of the stripes in the images 1000, 1100 indicate that the vehicle is turning or otherwise changing heading. The analysis processors may identify the direction of movement or heading of the vehicle as being opposite of the difference 1202 shown in FIG. 12.

Figure 13:
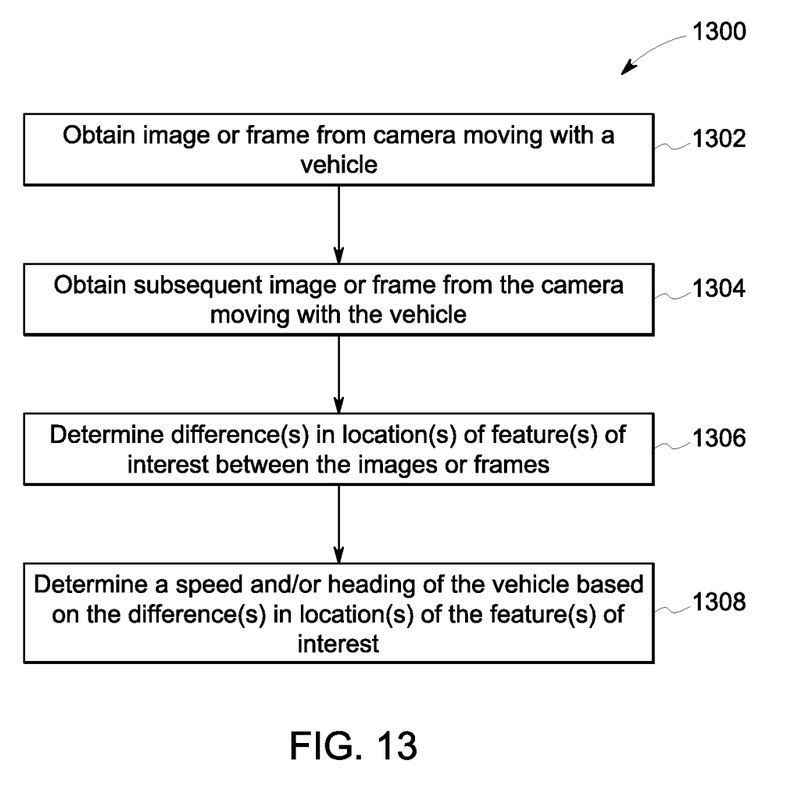
FIG. 13 illustrates a flowchart of one embodiment of a method for determining a vehicle speed and/or heading.

FIG. 13 illustrates a flowchart of one embodiment of a method 1300 for determining a vehicle speed. The method 1300 may be performed by one or more embodiments of the vehicle speed determination systems described herein. At 1302, an image or frame of a video is obtained from a camera that is moving with a vehicle. The camera may be attached to the vehicle or otherwise moving with the vehicle. At 1304, another image or frame of the video is obtained at a subsequent time from the camera. For example, the images or frames may represent a field of view of the camera at different times. At 1306, one or more differences in locations of one or more features of interest in the images or frames are determined. For example, the location of a rail tie, insulated joint, sign, crossing, building, road stripe, etc. may be identified in the images and a difference in the locations of the identified feature of interest between the images may be determined. In one aspect, changes in locations of several features of interest may be determined. At 1308, a speed and/or heading of the vehicle are determined from the differences in location of the one or more features of interest. As described above, the magnitude of the change in location of one or more features of interest between the images or frames may be proportional to the speed of the vehicle and a direction of the change in location of the one or more features of interest between the images or frames may be opposite in direction of the heading of the vehicle. Changes in the locations of several different features of interest may be used and an average, median, or other statistical calculation may be made of the changes to determine the vehicle speed and/or heading. The speed and/or heading that are determined may be used to implement one or more control actions. For example, in response to determining that the vehicle speed determined from the images is faster than a designated speed or speed limit, a control system of the vehicle may automatically slow or stop movement of the vehicle. In response to determining that the vehicle speed determined from the images is slower than a designated speed or speed limit, a control system of the vehicle may automatically increase the speed of the vehicle or instruct an operator that the speed of the vehicle can be increased.

Embodiments of the inventive subject matter relate to analyzing video data collected from an on-board video camera mounted on a vehicle facing a route (e.g., a locomotive facing a track). Using this route video an image analysis technique is applied to one or more frames of the video and the frames can be processed in real time. Using feature detection on individual frames and using the video frames per second attribute an idea of rate of change of pixels is calculated. Mapping the pixel distance to real track distance this pixel rate is converted to speed. Thus, a gauge of the vehicle speed is obtained purely by video analysis.

In an embodiment, video collected from an on-board camera on a locomotive or other vehicle facing the track or other route is analyzed frame-by-frame. Using image processing, the route is identified and prominent features on the route are identified. These prominent features on the route are tracked over frames in the video. As these features move in time the frames change and they are tracked in subsequent frames. Using this frame rate and pixel distance by which the features have moved, a calculation of rate of change of pixels is calculated. Using a mapping scale to pixel and real track distance this pixel change rate is converted to ground speed in meters per hour or otherwise.

In one embodiment, a system (e.g., a vehicle speed determination system) includes one or more analysis processors configured to be operably disposed onboard a vehicle and configured to receive image data of a field of view of a camera operably disposed onboard the vehicle. The one or more analysis processors are further configured to determine one or more of a speed or a heading of the vehicle as the vehicle is moving based at least in part on one or more differences in the image data.

In one aspect, at least part of the field of view of the camera includes a route of the vehicle that is external to the vehicle.

In one aspect, the system also includes the camera operably disposed onboard the vehicle and oriented such that the field of view of the camera includes the route. The route can be one of a road surface or a guided track that the vehicle travels on.

In one aspect, the system also includes a vehicle control system configured to be operably disposed onboard the vehicle. The vehicle control system can be configured to at least one of automatically control the vehicle based on the speed that is determined, to control display of the speed that is determined to an operator, to control storage onboard the vehicle of information of the speed that is determined, and/or to control communication off board the vehicle of the information of the speed that is determined.

In one aspect, the system also includes a vehicle control system configured to be operably disposed onboard the vehicle. The vehicle control system can be configured to automatically control the vehicle based on the speed that is determined.

In one aspect, the one or more analysis processors are configured to identify at least one feature of interest of the route in the image data that moves in time across plural frames of the image data, determine a total pixel distance by which the at least feature of interest has moved, determine a pixel rate of change based on the total pixel distance and a frame rate at which the image data is captured, and determine the speed based on the pixel rate of change and a correlation of a unit pixel distance to a unit route distance.

In one aspect, the one or more analysis processors are configured to determine the heading of the vehicle by determining a direction in which one or more features of interest in the image data has changed and determining the heading of the vehicle based on the direction.

In one aspect, the one or more analysis processors are configured to determine the one or more of the speed or the heading of the vehicle by identifying one or more features of interest in the image data and monitoring movement of the one or more features of interest in the image data, wherein the one or more analysis processors are configured to identify the one or more features of interest based on pixel intensities in the image data.

In one aspect, the one or more analysis processors are configured to apply one or more convolution filters to the image data in order to identify the one or more features of interest.

In one embodiment, a method (e.g., for determining a speed of a vehicle) includes receiving image data of a field of view a camera operably disposed onboard a vehicle and determining a speed of the vehicle when the vehicle is moving based at least in part on one or more differences in the image data.

In one aspect, at least part of the field of view includes a route of the vehicle external to the vehicle.

In one aspect, the camera is oriented such that the field of view of the camera includes a route. The route can be one of a road surface or a guided track that the vehicle is traveling on.

In one aspect, the method also includes one or more of controlling the vehicle based on the speed that is determined, controlling display of the speed that is determined to an operator, controlling storage onboard the vehicle of information of the speed that is determined, and/or controlling communication off board the vehicle of the information of the speed that is determined.

In one aspect, the method also includes automatically controlling the vehicle based on the speed that is determined.

In one aspect, the speed is determined by identifying at least one image feature of the route in the image data that moves in time across plural frames of the image data, determining a total pixel distance by which the at least one image feature has moved, determining a pixel rate of change based on the total pixel distance and a frame rate at which the image data is captured, and determining the speed based on the pixel rate of change and a correlation of a unit pixel distance to a unit route distance.

In one aspect, receiving the image data and determining the speed of the vehicle are carried out automatically by one or more processors onboard the vehicle.

In one aspect, identifying one or more features of interest in the image data based on pixel intensities in the image data and monitoring movement of the one or more features of interest in the image data. The speed can be determined based on the movement that is monitored.

In one aspect, identifying the one or more features of interest includes applying one or more convolution filters to the image data.

In one embodiment, a system (e.g., a vehicle speed determination system) includes one or more processors configured to receive images obtained at different times from a camera onboard a vehicle moving along a route. The one or more processors also are configured to determine a difference between the images and to determine one or more of a heading or a speed of the vehicle along the route based on the difference between the images.

In one aspect, the one or more processors are configured to determine a change in location of one or more features of interest in the images as the difference.

In one aspect, the one or more processors are configured to determine how far a location of a feature of interest changed between the images and determine the speed of the vehicle based on how far the location changed.

In one aspect, the one or more processors are configured to determine a direction in which a location of a feature of interest changed between the images and determine the heading of the vehicle based on the direction.

In one aspect, the one or more processors are configured to identify at least one feature of interest of the route in the images, determine a total pixel distance by which the at least one feature of interest has moved between the images, determine a pixel rate of change based on the total pixel distance and a frame rate at which the images are captured by a camera and determine the speed of the vehicle based on the pixel rate of change and a correlation of the total pixel distance to a route distance.

In one aspect, the system also includes a vehicle control system configured to be operably disposed onboard the vehicle. The vehicle control system is configured to at least one of automatically control the vehicle based on the one or more of the heading or the speed that is determined, to control display of the one or more of the heading or the speed that is determined to an operator, to control storage onboard the vehicle of information of the one or more of the heading or the speed that is determined, and/or to control communication off board the vehicle of the information of the one or more of the heading or the speed that is determined.

Components of the systems described herein may include or represent hardware circuits or circuitry that include and/or are connected with one or more processors, such as one or more computer microprocessors. The operations of the methods described herein and the systems can be sufficiently complex such that the operations cannot be mentally performed by an average human being or a person of ordinary skill in the art within a commercially reasonable time period. For example, the examination of the image data may take into account a large amount of information, may rely on relatively complex computations, and the like, such that such a person cannot complete the examination of the image data within a commercially reasonable time period to control the vehicle based on the examination of the image data. The hardware circuits and/or processors of the systems described herein may be used to significantly reduce the time needed to obtain and examine the image data such that the image data can be examined and damaged portions of a route can be identified within safe and/or commercially reasonable time periods.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A vehicle system comprising:
a camera disposed onboard a vehicle; and
one or more analysis processors configured to be operably disposed onboard the vehicle and configured to receive image data of a field of view of a camera, wherein at least part of the field of view of the camera includes a route of the vehicle that is external to the vehicle,
wherein the one or more analysis processors are configured to:
identify a stationary feature of interest in the image data;
determine a distance by which the stationary feature of interest moves in the image data between different frames or different images obtained at different times within the image data; and
determine a speed of movement of the vehicle based on the distance by which the stationary feature of interest moves in the image data between the different frames or the different images.

2. The vehicle system of claim 1, further comprising a vehicle control system configured to be operably disposed onboard the vehicle, wherein the vehicle control system is configured to at least one of automatically control the vehicle based on the speed that is determined, to control display of the speed that is determined to an operator, to control storage onboard the vehicle of information of the speed that is determined, or to control communication off board the vehicle of the information of the speed that is determined.

3. The vehicle system of claim 1, further comprising a vehicle control system configured to be operably disposed onboard the vehicle, wherein the vehicle control system is configured to automatically control the vehicle based on the speed that is determined.

4. The vehicle system of claim 1, wherein the one or more analysis processors are configured to determine a heading of the vehicle based on a direction in which positions of the stationary feature of interest change between the different frames or the different images in the image data.

5. The vehicle system of claim 1, wherein the one or more analysis processors are configured to identify the stationary feature of interest based on pixel intensities in the image data.

6. A method comprising:
receiving image data of a field of view of a camera operably disposed onboard a vehicle; and
determining a speed of movement of the vehicle while the vehicle is moving by identifying a stationary feature of interest in the image data and determining a distance by which the stationary feature of interest moves in the image data between different frames or different images obtained at different times within the image data.

7. The method of claim 6, further comprising one or more of controlling the vehicle based on the speed that is determined, controlling display of the speed that is determined to an operator, controlling storage onboard the vehicle of information of the speed that is determined, or controlling communication off board the vehicle of the information of the speed that is determined.

8. The method of claim 6, further comprising automatically controlling the vehicle based on the speed that is determined.

9. The method of claim 6, wherein receiving the image data and determining the speed of the vehicle are carried out automatically by one or more processors onboard the vehicle.

10. The method of claim 6, wherein the stationary feature of interest in the image data is identified based on pixel intensities in the image data.

11. The method of claim 6, further comprising determining a heading of the vehicle based on a direction in which positions of the stationary feature of interest change between the different frames or the different images in the image data.

12. The method of claim 11, wherein the heading of the vehicle is determined to be opposite of the direction in which the positions of the stationary feature of interest change in the image data.

13. A vehicle system comprising:
one or more processors configured to receive images obtained at different times from a camera onboard a vehicle moving along a route, the one or more processors configured to determine a difference between positions of a stationary feature of interest shown in the images and to determine a speed of movement of the vehicle along the route based on the difference between positions of the stationary feature of interest.

14. The vehicle system of claim 13, wherein the one or more processors are configured to determine a direction in which the positions of the stationary feature of interest change between the images and determine a heading of the vehicle based on the direction.

15. The vehicle system of claim 13, further comprising a vehicle control system configured to be operably disposed onboard the vehicle, wherein the vehicle control system is configured to at least one of automatically control the vehicle based on the speed that is determined, to control display of the speed that is determined to an operator, to control storage onboard the vehicle of information of the speed that is determined, or to control communication off board the vehicle of the information of the speed that is determined.

16. The vehicle of claim 13, wherein the camera is disposed inside the vehicle.

17. The vehicle of claim 13, wherein the stationary feature of interest includes an insulated joint of the route.

18. The vehicle system of claim 1, wherein the image data includes a video.

19. The vehicle system of claim 1, wherein the one or more analysis processors are configured to identify the stationary feature of interest based on chromacity in the image data.

* * * * *